United States Patent [19]

Deshay et al.

[11] 3,791,850

[45] Feb. 12, 1974

[54] FORMABLE, WELDABLE COATED ARTICLE OF MANUFACTURE

[75] Inventors: Robert V. Deshay; Robert A. Isaksen, both of Longmeadow; Atam P. Sahni, Springfield, all of Mass.

[73] Assignee: Monsanto Company, St. Louis, Mo.

[22] Filed: Aug. 30, 1971

[21] Appl. No.: 176,236

[52] U.S. Cl............ 117/75, 117/71 M, 117/132 A, 117/217, 117/218, 148/6.15 R, 219/86
[51] Int. Cl...................... B23k 11/10, B32b 15/04
[58] Field of Search... 117/75, 132 A, 71 M, 161 L, 117/161 UB, 217, 227; 148/6.15 R; 72/42, 46

[56] References Cited
UNITED STATES PATENTS

| 2,881,091 | 4/1959 | Schulze | 117/71 M |
| 3,325,432 | 6/1967 | Kellert et al. | 260/29.6 |
| 3,210,219 | 10/1965 | Jenkins | 148/6.15 R |
| 3,051,586 | 8/1962 | Heath et al. | 117/75 X |
| 2,839,438 | 6/1958 | Rosenbloom | 148/6.15 R |
| 2,411,590 | 11/1946 | Powell | 117/132 A |
| 2,270,662 | 1/1942 | Raney | 117/132 A |
| 3,196,039 | 7/1965 | Herbst et al. | 117/75 |

*Primary Examiner*—Ralph Husack
*Attorney, Agent, or Firm*—William J. Farrington

[57] ABSTRACT

Disclosed herein are formable, weldable articles of manufacture comprising a metal sheet coated with a first coating of metal phosphate and a second coating comprising a blend of polyvinyl butyral and phenolic resins in at least one non-corrosive organic solvent which is a solvent for each component of the resin blend having dispersed therein a basic zinc chromate and a particular atomized aluminum powder.

9 Claims, No Drawings

3,791,850

FORMABLE, WELDABLE COATED ARTICLE OF MANUFACTURE

BACKGROUND OF THE INVENTION

1. Field of the Invention

The present invention relates to formable, weldable articles of manufacture having surface coatings that renders them resistant to corrosion without interfering with the normal operations used to manufacture articles from rolled or coiled sheet metal such as bending, forming, drawing and welding. The coated metal sheets are also able to accept conventional topcoats without loss of adhesion, gloss or durability. The coatings are applied over sheet metals which have been phosphate pretreated to improve the adhesion and corrosion resistance of the novel coating combination.

2. Description of the Prior Art

A need for a spot weldable coating for steel sheeting that overcomes the deficiencies of the zinc pigmented primers or coatings is recognized by the industry. Zinc rich coatings must have particle to particle to metal contact for welding and a porous structure so that water can penetrate and hydrogen escape. The zinc and ferrous metal interface operates as a galvanic cell with zinc sacrificing itself to protect the metal. Although zinc rich primers are weldable, they lack flexibility and formability, hence, post fabricating operations destroy the protective integrity of such coatings.

The basic welding technique used on sheet metal is resistance spot welding, as opposed to other techniques such as fusion welding, arc welding, inert gas shielded arc welding and others. A large proportion of the manufactured items currently produced including automobiles, appliances, metal furniture, building products, etc., are fabricated by resistance spot welding.

This method of welding depends on the fact that in an electrical circuit, the temperature of the conductor at any point is directly proportional to its resistance. Thus, employing low resistance copper alloy electrodes on either side of the steel of high resistance, the sheets can be caused to melt and flow together. The typical electrical equipment used for spot welding steel sheeting uses 60 cycle current at 6 volts and 10,000 amps. Commercially, essentially 100 percent of the weld should be obtained in the first 12 cycles and 90 percent in the first two half cycles.

In order not to interfere with the above process, a coating must be substantially conductive. Normal primer coatings are at least 100–10,000 times too insulative. Generally, the lower the resistance the better and a specific resistance of less than 10 ohms per square centimeter is desirable. Resistance is also a function of film thickness. Experience indicates that more conductive compositions can be welded at heavy film thickness, while almost any coating can be welded through, if it is thin enough.

Traditionally, spray type weldable zinc primers have been prepared by loading heavily with fine metallic zinc dust (80± volume %) to provide the electrical contact particle to particle necessary for spot welding. Some roller-coat weld primer being developed consists of a basecoat overcoated by a conventional zinc rich topcoat. The basecoat promotes adhesion and flexibility which would normally be poor for zinc rich primers.

Spray metalized zinc coated steel and zinc rich primers require special zinc resistant topcoats or suitable barrier coats or weathering to provide adequate adhesion for topcoating. Hence, zinc rich coatings have not provided the industry with the highly functional properties needed for modern steel fabrication. Therefore, a need exits for a corrosion resistant coating system for steel sheeting that provides a coated steel sheeting that can be formed and spot welded without destroying the integrity of the coating.

SUMMARY OF THE INVENTION

In accordance with the present invention the deficiencies of the prior art have been overcome by providing a formable weldable article of manufacture comprising a metal sheet coated on at least one side with, A. a first base coating of a metal phosphate wherein the metal is selected from the group consisting of iron, zinc, manganese and lead, B. a second coating applied over the first base coating comprising in combination:
  1. About 50 to about 80 percent by weight of a polyvinyl butyral resin (total resin basis),
  2. about 20 to about 50 percent by weight of a phenolic resole resin (total resin basis),
  3. about 20 to about 30 percent by weight of a basic zinc chromate (total resin basis) and,
  4. about 30 to about 60 percent by volume concentration of an atomized aluminum powder based on the dry film volume of the second coating.

It is, therefore, an objective of this invention to provide corrosion resistant weldable coating combinations that will adhere to phosphated coil ferrous metal substrates.

It is a further objective that said coating combinations need not be removed from the metal prior to forming of the metal or welding and will provide a conducting coating that will allow the coated metal to be easily spot-welded during fabrication of parts.

Another objective of this invention is to provide a coating combination that does not require removal before additional priming and/or topcoating of the metal.

Yet another objective of this invention is to provide a coating combination for metal substates which will have a resistance of no more than 10 ohms when spot welded and will meet industry standards fr "breakthrough" and "tip life" when spot welded.

These and other objectives may be readily appreciated by those skilled in the art by reference to the following description of the preferred embodiments.

DESCRIPTION OF PREFERRED EMBODIMENTS

A fundamental ingredient of the novel coating combination that is necessary to provide weldability is atomized aluminum powder. It is characterized by a granular structure and a surface relatively free of oxide coating and is prepared by spraying (atomizing) molten aluminum from an orifice. Conventional aluminum pigments are prepared from atomized aluminum powder by ball milling with solvents and soaps whereby the particle size is reduced and the shape changed to leaf-like.

The particle size of the atomized aluminum powder used in the present invention is critical. Only those particles large enough to subtend essentially the entire distance from electrode face to steel substrate can efficiently conduct current. Particle to particle current flow does not occur when the aluminum content is increased to more than 90 percent by volume. By way of contrast in zinc rich primers, a very fine dust is used and current passes along a chain of at least 10 and possibly as many as 100 or more individual particles. Atomized aluminum develops an oxide layer which is sufficiently insulative to preclude current flow along a chain of small particles whereas the large particles of atomized aluminum are more conductive having only two insulating layers of oxide to break through.

This requirement, that a pigment particle have a diameter approximately equal to the thickness of the dry film applied is highly unusual in coatings, most particularly in corrosion resistant coatings. Most conventional pigments are very fine, normally less than a micron and do not provide weldability.

Atomized aluminum powders can be selected with known average particle sizes and particle size distributions that are functional in spot welding. The industry prefers coil weldable primers that can be coated to give a film thickness of 0.3 to 0.7 mil for economic reasons. The present invention requires that the atomized aluminum powder be selected so as to have an average particle size diameter that will bridge the thickness of the coating and provide a conductive path for the spot-welding current. More particularly, if the dried film coating is to be about 0.5 mil then the average particle size diameter of the atomized aluminum powder should be in the range of about 10 microns.

Commercial atomized aluminum powders having an average particle size of about 10 microns have been analyzed. Particle size analysis shows the particle size distribution to be such that about 50 percent of the weight of the particles are above 10 microns in diameter ranging from about 10 to 20 microns with about 50 percent below 10 microns ranging from about 10 microns to 5 microns.

Atomized aluminum powder having the particle size distribution indicated were tested in spot weldable primers and found to give corrosion resistant spot weldable coatings ranging from about 0.3 mil to 0.7 mil with the preferred range of coating thickness being 0.5 to 0.7 mil for a critical balance of corrosion resistance and spot weldability.

Atomized aluminum powder with larger or smaller average particle sizes are available, however, higher weight percentages of smaller particles give coatings that suffer from poor weldability in the preferred range of coating thicknesses and larger particles produce coatings with poorer corrosion resistance.

The particle size distribution can be varied over the range shown above and still retain operability. The distribution can be skewed to give a higher percentage of larger particles for thicker films, e.g., 0.7 mil films would preferably have average particle size of about 17.5 microns and 0.5 mil films about 12.5 microns. The particle size selection then is presented in illustration of the invention and are not intended as limitations thereof.

The quantity of atomized aluminum powder used has an influence on the weldability and corrosion resistance of coating. The amount selected should be such that the concentration of the particle sizes need to insure weldability are present in the coating. The required concentration has been found to be a volume concentration of at least about 30 percent but less than about 60 percent, based on the dry coating, of atomized aluminum powder that has an average particle diameter of about 10 microns and a particle size distribution of from about 5 microns to about 20 microns, whereby said coating has a resistance of less than 10 ohms.

The present invention provides weldable primers for metal sheeting that protect against corrosion by acting as a barrier against moisture and oxygen. The aluminum pigment volume concentration of the primers are in the range of from 30 to 60 percent, below the critical level at which there is no longer sufficient binder resin present to completely encapsulate all the pigment particles and to fill the interstices which could cause the film to become porous.

Welds prepared from metal coated with the preferred coating combination are of a quality equivalent to uncoated metal. Cross sectioning and etching and tensile strength measurements have confirmed this.

Other pigments can be incorporated in accordance with usual surface coating particles to change color, texture, opacity and to improve corrosion resistance. In particular, metal chromate salts such as zinc chromate and strontium chromate are used to improve corrosion resistance.

The method of application of coil coating applies some restraints to the choice of resins for these systems. The most fundamental of these restraints is that the system must cure very rapidly to hard non-blocking film after the coil is coated.

The preferred coatings of this invention are based on polyvinyl butyral resins in combination with certain phenolic resole resins. Such resin blend combinations provide the necessary properties for coil coatings such as:

1. forming a hard, nontacking film,
2. corrosion resistance when used in combination with phosphate pretreatment,
3. spot-weldability when used in combination with atomized aluminum powder,
4. bondability with finish topcoats and phosphate treated steel,
5. formability with the coil steel with maintenance of bond to the phosphate treated steel.

The corrosion resistance of the preferred combination depends on a pretreatment of the metal substrate with phosphate coatings. Two types are functional with the preferred coating. Iron phosphate treatment consists of coating steel with a very thin amorphous, iron oxide-iron phosphate film. It provides lower corrosion resistance but good flexibility and adhesion at low cost. Deposits of up to 50 mg./sq.ft. are common and suppliers suggest ranges of 25 to 120 mg./sq.ft.

Crystalline zinc phosphate is most commonly used as a paint base. It provides poorer flexibility and adhesion, but better resistance to corrosion. Deposits of 200 mg./sq.ft. and a range of 150 to 2000 mg./sq.ft. make such coating more costly.

Either phosphate pretreatment has been found to be operable with the coating combination of the present invention if the phosphate coating is less than 100 mg./sq.ft. Coatings heavier than this render the surface non-conductive and make the steel difficult if not impossible to weld.

DEFINITION OF TERMS

In describing the products of this invention, both above and hereafter, certain terms have been and will be employed which will now be generally defined upon which limits of the present invention will be set.

Breakthrough — As used herein the term "breakthrough" refers to the time, measured in cycles using 60 cycle current, required for essentially 100 percent of the current input in a spot weld to pass through a particular coated substrate. Put another way, it is the time necessary for the natural resistance of the particular system to be overcome by the energy of the welding current. It is economically advantageous that this period be as short as possible.

Tip Life — As employed herein, the term "tip life" refers to the period of useful employment that may be obtained from a pair of spot welding electrodes. Thus, it is required by the industry that under certain conditions to be hereinafter more fully described, the tips of a pair of electrodes will remain in operable condition for at least 2000 welds. It is important to note that the extent of tip life is directly connected with the composition of the weldable coating with which it comes in contact. That is to say, certain components of a given coating will tend to decrease tip life more than others. Thus, for optimization of tip life, it is important that only particular components in particular concentrations be employed.

Coil Coatable Weld Primer — By coil coatable weld primer is meant coatings that can be roller coated onto ferrous metal sheeting that has been previously phosphate coated at the mill. The coil coatable weld primer must conduct the necessary current to weld the metal parts during fabrication. The fabricated parts may receive another phosphate treatment and then given one or more coats of primer and topcoat before final assembly.

The polyvinyl butyral employed in the practice of this invention has a vinyl alcohol content of from 5 to 30 weight percent and a residual acetate content of less than 10 weight percent, based on total resin weight. Especially preferred are polyvinyl butyrals with a vinyl alcohol content of from about 9.0 to 13.0. The weight average molecular weight of the polyvinyl butyral can be in the range of from 30,000 to 270,000 with a preferred range of 30,000 to 40,000.

The other essential resin of the resin blend is a conventional phenolic-aldehyde thermosetting resole which are well known to those skilled in the art. Being a phenolic resole the "methyol" group provides solubility in organic solvents for use as a primary film former or modifier in primer coatings. Such resoles are heat curable and provide hard, corrosion resistant coatings at full cure using temperatures of 350°F to 450°F. Used alone as a primary film former it provides hard films at full cure that are corrosion resistant. Their flexibility depends on degree of cure. When properly cured it provides coatings that have a high degree of general chemical and solvent resistance and flexibility.

In the interaction of the preferred blend of polyvinyl butyral and phenolic resole used in the present invention is not completely understood. However, the blend by its coaction on drying and curing provides a coating that has the flexibility of the butyral component yet is non-tacky and has the hardness and corrosion resistance of the phenolic resole component.

The following examples are set forth in illustration of this invention and should not be construed as limitations thereof.

EXAMPLE I

This example is set forth to illustrate the formable, weldable coated ferrous metal sheet of the present invention and to demonstrate the proportions of polyvinyl butyral resin and phenolic resole resin needed to provide said properties.

A formable, weldable, anti-corrosive primer is prepared by blending the following components:

| Phenolic Resin Component (P) | Weight Percents |
|---|---|
| Phenol-Aldehyde Resole Resin Solution(1) | 44.4% |
| Valimet 818 Atomized aluminum Powder | 55.6% |
| (1) Properties of Resole Resin Solution * | |
| Solids (ASTM D-115-41) | 50 ± 2 |
| Butanol, % | 25 |
| Xylol, % | 25 |
| Viscosity (Gardner-Holdt) | A-H |
| Specific gravity, 25°C | 0.985 |
| * Monsanto Company Resinox P-97 | |

| Polyvinyl Butyral Resin Component (B) | Weight Percents |
|---|---|
| Butyral Resin(1) | 10.8% |
| Valimet 818(2) | 24.5% |
| Basic Zinc Chromate | 2.5% |
| Butylated Melamine Formaldehyde Resin Solution(3) | 2.2% |
| Solvents (50/50, Xylol/Butanol) | 60.1% |

(1) Polyvinyl Butyral Resin*
  Preferred range of properties:
  Weight average molecular wgt.—38,000 to 45,000

Polyvinyl alcohol content (wgt. %) — 9.0 to 13.0

Polyvinyl butyral content (wgt. %) — about 88
  Polyvinyl acetate content (wgt. %) — 0 to 2.5
  * Butvar B-79, Monsanto Company (2) Valimet 818 - Atomized aluminum from the Valley Metallurgical Company having an average particle size of 10 microns.

(3) Resimene 872, Monsanto Company Resin 50% solids by weight in Butanol

The phenol-aldehyde resole resin solution has 50 percent resin solids by weight as indicated above. To this is added 55.6 percent by weight of atomized aluminum powder which is uniformly dispersed with vigorous mixing.

The butyral component is prepared by dissolving the butyral resin and butylated melamine resin in the solvents by conventional stirring. The zinc chromate and atomized aluminum powder are then dispersed in the resin solution uniformly with vigorous mixing.

The phenolic and butyral components are blended by weight in differing proportions to give a uniform coil by conventional stirring.

COATING OF METAL SHEET

Panels of 20 gauge cold rolled steel sheeting were obtained from the Lubrizol Corporation. The panels are 4 × 12 inches and are coated with Metabond 42, giving a iron phosphate coating of 25 mg./sq.ft. on both sides. Generally, for spot welding, a range of 15 to 100 milligrams per square foot can be used but a range of 15 to 50 is preferred.

The panels were then coated with the primer using draw-down rods to a nominal dry film thickness of 0.5 mils. The metal plates were coated with the above primer diluted to a viscosity of about 150 to 200 seconds as measured by Ford Cup No. 4. Those skilled in the art will recognize the viscosity should be adjusted so that the primer will flow out on the panel and give a uniform coating and not to be so diluted so as to run off the panel. Those panels were coated to a nominal thickness to 0.5 mils on at least one side, however, this system is functional with coatings in the range of 0.3 to 0.7 mil.

The coated plates are placed in an oven at 500° ± 15°F. for about 90 seconds which brings the metal plates to about 390°F. The time can be varied from 70 to 120 seconds, with the object being to essentially cure the coating so that it has good solvent resistance as tested by the rub test of the National Coil Coaters Association wherein the cured coating must pass 25 xylol rubs without removal of sufficient primer to reach the phosphate coating.

The baked cured panels are then aged overnight at 77° ± 15°F. before testing further. The baked panels are evaluated in their appearance and evaluated for pin holes, craters or abnormal roughness and then tested using the following test procedures.

TESTING OF COATED SHEET PROPERTIES

REVERSE IMPACT TEST

The reverse impact test which consists of a two-pound rod with a nominal diameter of 1 inch and a length of 18 inches having a radial tip of ½ inch radius. The rod is dropped vertically a certain number of inches and the ability of the panel to deform is measured versus the ability of the coating to withstand this deformation without cracking. The panel on impact deforms into a cup deformation. The rounded cup is tested by placing a cellophane tape ½ inch in width over the raised cup and the cellophane tape is stripped to determine whether or not the coating has lost its adhesion during the deformation of the test. The rod is dropped from various heights and the test has a readout of inch-pounds versus adhesion of the primer coating. Generally, impact levels of 40 inch-pounds to 100 inch-pounds are acceptable as a measure of the adhesion of the primer coating.

T-BEND TEST

This test is used to determine tee flexibility of the coating wherein the coated metal sheet is folded 180° on itself. The first bend is called zero bend. The sheet is again folded on itself several times with each successive fold coded T1, T2, T3, T4, as readings for this test. It is recognized that the first bend is more rigorous than the following bends as the radius is much smaller but increases as the sheet is continuously folded on itself. The industry prefers 1T to 2T on this test. To determine whether or not the coating passes, ½ inch cellophane tape is adhered over the bend on its longitudinal axis and stripped to determine whether or not the coating has retained its adhesion to the metal. This is a go-no-go test and if any coating strips the specimen has failed.

BLOCKING RESISTANCE

Ten panels are stacked and a weight of 1,000 grams is placed on the stack and let stand overnight at 77° ± 15°F. If the sheets separate easily the coating has cured to essentially full cure and the coatings will not block. This test is important to coil coatings in that the sheet is continuously coated, baked and rolled into large coils which creates considerable weight on the coating as it contacts the phosphate coating. The coils must be unrolled without blocking, hence, this simple test determines whether or not essentially full cure is obtained, and a non-blocking film obtained.

QUENCHING

The sheet is removed from the baking oven and quenched in water at room temperature which simulates the coil coating operation wherein the coating coil is baked and run through water to cool before winding into the coil. If the sheet has not cured sufficiently in the oven and is then quenched the sheet will fail on the blocking test indicated above.

SPOT WELDING TEST

To determine the weldability, welding tests are run on a commercial spot welding machine. The welding test is run at 4–6 volts, 10,000 amperes, 12 cycles and 500 lbs. of electrode force. The coatings are applied to one side of the cold rolled steel panels and the weldability is tested with the two coated sides together. The weldability of the coating is determined by the amount of current realized in the second half-cycle of the spot welding cycle. If less than 90 percent of the current is achieved in the second half-cycle the weldability is considered to be fair. If 90 percent of the current is realized in the second half-cycle the weldability is considered to be good. If more than 90 percent of the current is realized in the second half-cycle the weldability is considered to be excellent. If a weld is obtained in 12 cycles the panel is weldable.

SALT SPRAY TEST

This test used is the Standard ASTM B-117. The corrosion resistance of the panel is determined when tested for 250 hours according to the ASTM test. The three test panels are as follows:
  A. Coated coil stock panel (control).
  B. Panel A coated with Gulf 370 oil and aged for 8 hours at 400°F.
  C. Panel B coated oiled as in B and phosphatized.

These various post-treatments are typical of those used in the industry. The parts are fabricated and must stand the salt spray test. After the above tests there should be no evidence of rust forming on the coated side of the panel. In addition there should be no evidence of blistering, flaking or corrosion of any nature on the coated side of the panel or the coating has failed.

PENCIL HARDNESS TEST

The coated side of the panel is placed face-up on a flat surface. The operator presses on the panel with pencils of varying hardness. The panel fails when the lead penetrates the coating and the hardness rating is determined by that hardness that does not penetrate. The range of hardness for pencils range from 6B being the softest to 9H being the hardest, i.e., 6B to B, HB, F, H to 9H. The combination coatings taught vary in hardness from H to 4H with less than 3H being preferred and 1–2H most preferred. The hardness of the coil coating primer is critical in that if too soft, i.e., softer than H then the coating will mar or tack when the coated coil steel is rolled into a coil. If the coil coating primer is harder than 3H then the coating is more difficult to weld.

WATER IMMERSION TEST

Water immersion is run with a water bath at 100°F. in which the samples are immersed completely for 500 hours. The samples are removed and wiped and judged for blistering. Distilled or deironized water is used and the bath is driven with a mixer to insure unifrom circulation of water around the test panels. Air is bubbled into the bath at a rate of 1 bubble per second. The panels are removed, dried and rated as to blistering, flaking and corrosion

CONDENSING HUMIDITY TEST

This test involves condensing moisture on panels. The panels are placed in the chamber such that they rest horizontally in the cabinet and form a roof for the condensing moisture. The cabinet is run at 110°F. with the panels running at 70°F. The samples are removed from the cabinet at 500 hours and judged for blistering, flaking and corrosion. The coating passes if it can withstand 500 hours and in this test without any surface failure.

The test results on the coated ferrous metal sheets are shown below in Table I. The butyral resin component was tested from 0 to 100 percent by weight in combination with the phenolic resole resin and the described pigments.

| Ingredient | A (Weight %) | B (Weight %) |
|---|---|---|
| Polyvinyl Butyral Resin (1) | 9.17 | 8.83 |
| Phenolic Resole Resin(2) | 7.17 | 3.45 |
| Basic Zinc Chromate | 3.17 | 2.62 |
| Valimet 818 Aluminum Powder | 28.12 | 23.26 |
| Xylene | 29.96 | 33.88 |
| Butanol | 22.53 | 27.93 |
|  | 100.00 | 100.00 |
| Weight % of Butyral resin | 72% | 83.6% |

These formulas both showed excellent hardness (F-2H), 160 lb. reverse impact, and 1-2T flexibility. A was rated excellent in corrosion resistance but only good in welding. B was ranked good in corrosion resistance but excellent in welding.

1. Monsanto Company, Butvar B-79
2. Monsanto Company, Resinox P-97

Here the B formulation containing about 28 percent phenolic gave slightly higher corrosion resistance than B having about 16 percent phenolic resole because of the greater curability of the coating. The B formulation has greater ease in welding as it contains more butyral resin and is more easily deformed in spot welding to gain good conductivity through the aluminum pigment particles to the ferrous metal sheet.

TABLE I

Blends of Polyvinyl Butyral Resin (B) With Phenolic Resole Resin (P)

|  | P | 3P/1B | 2P/2B | 1P/3B | B |
|---|---|---|---|---|---|
| % Butyral/Total Resin | 0 | 13.7% | 32% | 59.6% | 100% |
| Pencil Hardness | 5H | HB | HB | HB | F |
| Reverse Impact |  |  |  |  |  |
| 80 in. lb. | Fail | Fail | Fail | Pass | Pass |
| 10 in. lb. | Fail | Fail | Fail | Pass | Pass |
| T Bent OT | Fail | Fail | Fail | Fail | Fail |
| T Bent 1T | Fail | Fail | Fail | Pass | Pass |
| T Bent 2T | Fail | Fail | Pass | Pass | Pass |
| T Bent 3T | Fail | Fail | Pass | Pass | Pass |
| Weld | Poor | Poor | Fair | Good | Excellent |
| Salt Spray | Excellent | Excellent | Excellent | Good | Fair |

By referring to Table I it is at once apparent that coil steel coated with resin blends having less than about 50 percent butyral resin are grossly deficient in weldability, impact strength and formability whereas those having very high percentages of butyral are seriously deficient in hardness and corrosion resistance. A balance of the above critical properties is essential and hence the resin blend proportions then become critical for this novel coating system. Further experimental work was carried out to establish the preferred proportions to provide a critical balance of properties and is shown in the following examples.

EXAMPLE 2

Two coating primers were formulated as shown below to teach the most preferred higher percentages of butyral resin to be used in the resin blend.

It is evident that if the butyral resin proportion has much higher than about 80 percent that the coating will suffer in corrosion resistance and will lack the necessary hardness for rolled and coiled steel.

EXAMPLES 3 to 8

The following examples are set forth in Table II to teach the critical lower percentages of butyral resin that are operable and provide a balance of properties. The coil steel sheets were coated and tested as in Example 1. The atomized aluminum powder was used at a weight percent of 300 percent of the dry weight of the resin blend calculating to a volume concentration of 56 percent on each dried film. No zinc chromate was used in the formulations to teach the functionality of the aluminum powder alone in spot welding.

TABLE II

| Example | 3 | 4 | 5 | 6 | 7 | 8 |
|---|---|---|---|---|---|---|
| Butyral Wgt. % | 0 | 20 | 40 | 60 | 80 | 100 |
| Xylol | 5 | 70 | 120 | 130 | 135 | 135 |
| Butanol | 5 | 50 | 120 | 130 | 135 | 135 |
| Butyral Resin(1) | 0 | 20 | 40 | 30 | 40 | 40 |
| Phenolic Resole Resin(2) | 200 | 160 | 120 | 40 | 20 | 0 |
| Val.Met. 818 | 300 | 300 | 300 | 150 | 150 | 120 |

TABLE II—Continued

| Example | 3 | 4 | 5 | 6 | 7 | 8 |
|---|---|---|---|---|---|---|
| Butyral Wgt. % | 0 | 20 | 40 | 60 | 80 | 100 |
| Solids %(3) | 48 | 33 | 25 | 15 | 10 | 10 |
| Viscosity(4) | 470 | 320 | 228 | 51 | 109 | 88 |
| Pencil Hardness | 5H | 4H | 3H | 2H | H | F |
| Weldability | Poor | Fair | Fair | Good | Ex. | Ex. |
| T-Bend | 2T | 2T | 1T | 1T | 0T | 0T |
| Salt Spray(5) | 6 | 6 | 6 | 5 | 4 | 1 |
| Reverse Impact | Fail | Fail | Fail | Pass | Pass | Pass |

(1) Butvar B-79, Monsanto Company
(2) P-97 — 50% Solids in 50/50, Xylol/Butanol, Monsanto Company
(3) % resin solids based on total primer
(4) Viscosity in seconds by Ford Cup No. 4
(5) Evaluated on a scale of from 1 to 6 with 1 being inadequate corrosion resistance and 6 excellent The Table II test results clearly teach that a polyvinyl butyral content of less than about 50 percent give coated articles that are deficient in weldability and impact strength whereas those that are over about 80 percent butyral are seriously lacking in hardness and corrosion resistance. The critical balance of functional properties needed for a formable, weldable and corrosion resistant coated steel sheeting then requires a preferred blend of resins having about 50 percent to about 80 percent polyvinyl butyral resin and about 20 percent to 50 percent phenolic resole resin on weight percent basis of total resin.

The preferred blend of resin has a relatively narrow range of proportions taat provide the critical balance of properties. The preferred narrow range of proportions is not predictable because of the critical balance of functional properties of the product. Table II data teach clearly that weldability and impact strength decrease rapidly below about 50 percent buryral resin and 50 percent resole resin content whereas hardness and corrosion resistance (salt spray) decrease rapidly above about 80 percent butyral resin and 20 percent resole resin content.

The coil coatable weld primers of this invention may be further formulated with other additives that are known to those skilled in the art. Examples of these include anti-settling agents, anti-gassing agents and odor masking agents.

Softer coil weldable coatings can be produced by the addition of plasticizers to the butyral resin such as esters including phthalates, phosphates, sebacates, hexoates, adipates and others that are known to be compatible with polyvinyl butyral resins.

Addition of anti-corrosion pigments to weldable primer formulation does not appear to effect weldability. Tests also indicate that addition of anti-corrosion pigments such as zinc chromate, strontium chromate, chromium oxide, etc., to weld primer formulation yields better adhesion and corrosion protection. The level of these anti-corrosion pigments should be in the range of 0–30 percent based on total resin solids. These are conventional anti-corrosion pigments and are used as such.

In industry, two types of zijc chromates are made and both are used mainly in corrosion inhibitive metal primers. The more widely used product has been loosely called zinc chromate but the proper name for it is zinc yellow. It is dehydrated double salt of zinc chromate and potassium chromate, having a probably composition of 4 $ZnO.K_2O.4\text{-}CrO_3.3H_2O$.

The corrosion inhibitive property of zinc yellow is explained by its basicity and the rust inhibitive chromate ions that are released because of its slight water solubility.

The second and newer type of zinc chromate pigments is generally known as basic zinc chromate. The approximate composition is given as 5 $ZnO.CrO_3.4\text{-}H_2O$. It is substantially insoluble in water. This type of pigment is widely used in wash primers.

Pigments that are conductive can be used in combination with the atomized aluminum such as graphite, zinc, lead, copper and tin pigments. Said pigments are usually very fine and cannot replace more than 10 percent volume concentration of the larger atomized aluminum powder or weldability will be decreased.

From the foregoing it should be apparent to those skilled in the art that many modifications can be made in this invention without departing from the scope and spirit thereof.

What is claimed is:
1. A formable, weldable article of manufacture comprising a metal sheet coated on at least one side with,
  A. a first base coating of a metal phosphate wherein the metal is selected from the group consisting of iron, zinc and manganese,
  B. a second coating applied over the first base coating comprising in combination:
    1. about 50 to about 80 percent by weight of a polyvinyl butyral resin based on the weight of the total resin,
    2. about 20 to about 50 percent by weight of a phenolic resole resin based on the weight of the total resin,
    3. about 0 to about 30 percent by weight of a basic zinc chromate based on the weight of the total resin, and,
    4. about 30 to about 60 percent by volume concentration of an atomized aluminum powder based on the dry film volume of the second coating.
2. The article of manufacture of claim 1 wherein the polyvinyl butyral resin in the second coating has a polyvinyl alcohol content of from about 5 to about 30 percent by weight, a residual polyvinyl acetate content of less than 10 percent by weight and a weight average molecular weight of from 30,000 to 270,000.
3. The article of manufacture of claim 1, wherein the atomized aluminum powder has an average particle size of about 10 microns with a particle size distribution of from about 5 microns to about 20 microns.
4. The article of manufacture of claim 1 wherein the metal sheet is a ferrous metal sheet.
5. The article of manufacture of claim 4 wherein the coated metal sheet is spot-weldable.

6. The article of manufacture of claim 4 having a T bend capability of 1 to 2T, a reverse impact of at least 160 inch pounds and a pencil hardness less than 3H.

7. The article of manufacture of claim 1 wherein the first coating is iron phosphate in amounts ranging from about 15 mg./sq.ft. to about 50 mg./sq.ft.

8. The article of manufacture of claim 1 wherein the second coating has been cured at a temperature in the range of 350° to 450°F.

9. The article of manufacture of claim 1 wherein the second coating has a thickness in the range of 0.3 to 0.7. mil.

* * * * *